(12) United States Patent
Cheng et al.

(10) Patent No.: US 9,369,248 B2
(45) Date of Patent: Jun. 14, 2016

(54) METHOD AND COMMUNICATION NODE FOR MAPPING AN ENHANCED PHYSICAL DOWNLINK CONTROL CHANNEL, EPDCCH, MESSAGE

(71) Applicant: Telefonaktiebolaget L M Ericsson (publ), Stockholm (SE)

(72) Inventors: Jung-Fu Cheng, Fremont, CA (US); Erik Eriksson, Linköping (SE); Mattias Frenne, Uppsala (SE); Johan Furuskog, Stockholm (SE); Havish Koorapaty, Saratoga, CA (US); Daniel Larsson, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 142 days.

(21) Appl. No.: 13/978,894

(22) PCT Filed: Jan. 30, 2013

(86) PCT No.: PCT/SE2013/050078
§ 371 (c)(1),
(2) Date: Jul. 10, 2013

(87) PCT Pub. No.: WO2014/046591
PCT Pub. Date: Mar. 27, 2014

(65) Prior Publication Data
US 2014/0078978 A1    Mar. 20, 2014

Related U.S. Application Data

(60) Provisional application No. 61/702,817, filed on Sep. 19, 2012.

(51) Int. Cl.
*H04L 5/00* (2006.01)
*H04L 1/00* (2006.01)
*H04L 1/18* (2006.01)

(52) U.S. Cl.
CPC ............ *H04L 5/0037* (2013.01); *H04L 1/0041* (2013.01); *H04L 1/0046* (2013.01); *H04L 1/0061* (2013.01); *H04L 5/00* (2013.01); *H04L 5/0053* (2013.01); *H04L 1/1861* (2013.01)

(58) Field of Classification Search
None
See application file for complete search history.

(56) References Cited

U.S. PATENT DOCUMENTS

2011/0105162 A1\* 5/2011 Kim et al. .................. 455/500
2012/0076043 A1\* 3/2012 Nishio et al. ................ 370/252

(Continued)

FOREIGN PATENT DOCUMENTS

WO    2012109542 A1    8/2012

OTHER PUBLICATIONS

3rd Generation Partnership Project. 3GPP TS 36.211 V8.9.0 (Dec. 2009). 3rd Generation Partnership Project; Technical Specification Group Radio Access Network; Evolved Universal Terrestrial Radio Access (E-UTRA); Physical Channels and Modulation (Release 8). Dec. 2009, pp. 1-83.

(Continued)

*Primary Examiner* — Jeffrey M Rutkowski
*Assistant Examiner* — Thomas D Busch
(74) *Attorney, Agent, or Firm* — Murphy, Bilak & Homiller, PLLC

(57) ABSTRACT

A method in a communication node for mapping symbols of an Enhanced Physical Downlink Control Channel, EPDCCH, message is provided. The EPDCCH comprises one or more aggregation levels. For each aggregation level, an EPDCCH message is constituted by a set of Control Channel Elements, eCCEs. Each eCCE is mapped to a set of multiple enhanced Resource Element Groups, eREGs, wherein each eREG is a group of Resource Elements, REs, in a Physical Resource Block, PRB, pair. The communication node maps the symbols of the EPDCCH message to the set of REs that constitutes the multiple eREGs that the set of eCCEs correspond to. The order in which the EPDCCH symbols are mapped to the set of REs is dependent on the aggregation level.

22 Claims, 14 Drawing Sheets

(56) References Cited

U.S. PATENT DOCUMENTS

| | | | | |
|---|---|---|---|---|
| 2013/0010724 | A1* | 1/2013 | Han et al. | 370/329 |
| 2013/0039284 | A1* | 2/2013 | Marinier et al. | 370/329 |
| 2013/0194931 | A1* | 8/2013 | Lee et al. | 370/241 |
| 2013/0242886 | A1* | 9/2013 | Chen et al. | 370/329 |
| 2013/0250880 | A1* | 9/2013 | Liao et al. | 370/329 |
| 2013/0301562 | A1* | 11/2013 | Liao et al. | 370/329 |
| 2014/0003452 | A1* | 1/2014 | Han et al. | 370/474 |
| 2014/0036747 | A1* | 2/2014 | Nory et al. | 370/311 |
| 2014/0056279 | A1* | 2/2014 | Chen et al. | 370/330 |
| 2014/0126487 | A1* | 5/2014 | Chen | H04B 15/00 370/329 |

OTHER PUBLICATIONS

3rd Generation Partnership Project. 3GPP TS 36.212 V8.8.0 (Dec. 2009). 3rd Generation Partnership Project; Technical Specification Group Radio Access Network; Evolved Universal Terrestrial Radio Access (E-UTRA); Multiplexing and channel coding (Release 8). Dec. 2009, pp. 1-60.

3rd Generation Partnership Project. 3GPP TS 36.213 V8.8.0 (Sep. 2009). 3rd Generation Partnership Project; Technical Specification Group Radio Access Network; Evolved Universal Terrestrial Radio Access (E-UTRA); Physical layer procedures (Release 8). Sep. 2009, pp. 1-70.

3rd Generation Partnership Project. "Mapping of ePDCCH to RE." 3GPP TSG-RAN WG1 #69, R1-122000, May 21-25, 2012, pp. 1-4, Prague, Czech Republic.

3GPP, "3rd Generation Partnership Project; Technical Specification Group Radio Access Network; Evolved Universal Terrestrial Radio Access (E-UTRA); Physical Channels and Modulation (Release 8)", 3GPP TS 36.211 V8.5.0, Dec. 2008, 1-82.

Unknown, Author, "Confusing multiple PDCCH aggregation levels", Qualcomm Europe, 3GPP TSG-RAN WG1 #53bis, R1-082544, Warsaw, Poland, Jun. 30-Jul. 4 2008, 1-7.

* cited by examiner

Fig. 1 The LTE downlink physical resource

Example where the 1$^{st}$ and 4$^{th}$ eCCE could be detected correctly an AL=1 EPDCCH even though the transmitted EPDCCH use AL=4

METHOD AND COMMUNICATION NODE FOR MAPPING AN ENHANCED PHYSICAL DOWNLINK CONTROL CHANNEL, EPDCCH, MESSAGE

TECHNICAL FIELD

Embodiments herein relates to a communication node and a method therein. In particular, the technical field relates to mapping symbols of an Enhanced Physical Downlink Control Channel, EPDCCH, message.

BACKGROUND

3$^{rd}$ Generation Partnership Project (3GPP) Long Term Evolution (LTE) technology is a mobile broadband wireless communication technology in which transmissions from base stations, also referred to as Evolved NodeBs (eNBs) to mobile stations, also referred to as User Equipments (UEs), are sent using Orthogonal Frequency Division Multiplexing (OFDM). OFDM splits the signal into multiple parallel subcarriers in frequency. The basic unit of transmission in LTE is a Resource Block (RB) which in its most common configuration comprises 12 subcarriers and 7 OFDM symbols, one slot. A common term is also a Physical Resource Block (PRB) to indicate the RB in a physical resource. Two PRB in the same subframe that use the same 12 subcarriers are denoted a PRB pair. This is the minimum resource unit that can be scheduled in LTE.

A unit of one subcarrier and one OFDM symbol is referred to as a Resource Element (RE) 4 as shown in the downlink physical resource 2 representation in FIG. 1. Thus, a PRB includes 84 REs. An OFDM symbol 6 including cyclic prefix is also shown in FIG. 1. The cyclic prefix makes the OFDM signal less sensitive to time dispersion of the channel. Inserting a cyclic prefix is achieved by simply copying the last part of the OFDM symbol and inserting it at the beginning of the OFDM symbol. An LTE radio subframe is composed of multiple resource blocks in frequency with the number of PRBs determining the bandwidth of the system, and two slots in time as shown by the downlink subframe 8 of FIG. 2. Additionally, in the time domain, LTE downlink transmissions may be organized into radio frames of 10 ms, each radio frame comprising ten equally-sized subframes of length $T_{subframe}$=1 MS.

Messages transmitted over a radio link to UEs may be broadly classified as control messages and data messages. Control messages are used to facilitate the proper operation of the system as well as proper operation of each UE within the system. Control messages could include commands to control functions such as the transmitted power from a UE, signaling of RBs within which the data is to be received by the UE or transmitted from the UE and so on.

In Release 8 of the 3GPP LTE specifications, with specific reference to 3GPP TS 36.211, TS 36.212, TS 36.213, the first one to four OFDM symbols, depending on the configuration, in a subframe are reserved to contain such control information, as shown, for example, by control region 10 of FIG. 2. Furthermore, in Release 11 of the 3GPP LTE specifications, an enhanced control channel was introduced, Enhanced Physical Downlink Control Channel (EPDCCH), in which PRB pairs are reserved to exclusively contain EPDCCH transmissions, although excluding from the PRB pair the one to four first symbols that may contain control information to UEs of releases earlier than Release 11 of the 3GPP LTE specifications. An illustration of this is shown in FIG. 3. In FIG. 3, the downlink subframe 12 showing ten RB pairs and configuration of three EPDCCH regions, referred to as filled with horizontal, vertical and diagonal stripes, of size one PRB pair each. The remaining PRB pairs may be used for Physical Downlink Shared Channel (PDSCH) transmissions.

Hence, the EPDCCH is frequency multiplexed with PDSCH transmissions contrary to PDCCH which is time multiplexed with PDSCH transmissions. The Resource Allocation (RA) for PDSCH transmissions exists in several RA types, depending on the Downlink Control Information (DCI) format. Some RA types may have a minimum scheduling granularity of a Resource Block Group (RBG). An RBG is a set of adjacent, in frequency, resource blocks and when scheduling the UE, the UE is allocated resources in terms of RBGs and not individual RBs.

When a UE is scheduled in the DownLink (DL) and the Downlink Control Information (DCI) message is carried by an EPDCCH, the UE shall assume that the PRB pairs carrying a DL assignment are excluded from the resource allocation, i.e., rate matching applies. Here, rate matching means that the number of output bits from the encoder is ensured to match the number of available physical channel bits. So in this context, the PRB pairs carrying a DL assignment does not have any physical channel bits available for PDSCH transmission. Rate matching is carried out by systematically removing encoded bits from the output. Which bits are removed are known at both the transmitter and receiver side. This is also known as code chain rate matching. For example, if a UE is scheduled a PDSCH in a certain RBG of size of 3 adjacent PRB pairs, and one of these PRB pairs comprises the DL assignment, the UE shall assume that the PDSCH is only transmitted in the two remaining PRB pairs in this RBG. Note also that multiplexing of PDSCH and any EPDCCH transmission within a PRB pair is not supported in Release 11 of the 3GPP LTE specifications.

The PDCCHs and EPDCCHs are transmitted over radio resources that are shared between several user UEs. Each PDCCH comprises smaller parts, known as Control Channel Elements (CCEs), to enable link adaptation by controlling the number of CCEs a PDCCH is utilizing. The number of CCEs in a PDCCH is called its CCE aggregation level, and may be 1, 2, 4, or 8 consecutive CCEs, logical sequence. The total number of available CCEs within the control region, see FIG. 2, is determined by a Physical Control Format Indicator Channel (PCFICH) configuration, the system bandwidth and the number of configured PHICH resources. Each PDCCH comprises exactly one DCI.

Multiple aggregation levels are required to support multiple DCI formats to improve resource utilization and to provide means for adapting the code rate of the DCI message to the channel quality. The DCI size varies a lot depending on the format and the channel bandwidth. PDCCHs with different aggregation levels may increase the granularity of the resource utilization, instead of a "one size fits all" solution. Higher aggregation levels may be used for broadcast control message resource allocations to provide more protection. The aggregation level for control messages may be 4 or 8, while the aggregation level for DCI messages that schedule UE specific PDSCH or PUSCH transmissions may be 1 or 2 or 4 or 8. Hence it is specified that for PDCCH, a UE has to monitor four aggregation levels of CCEs, namely, 1, 2, 4, and 8, for UE-specific search space and two aggregation levels of CCEs, namely, 4 and 8, for common search space. A search space is the collection of CCE within the total set of all CCEs in a subframe where the UE may find (i.e is searching for) its PDCCH candidates.

3GPP Technical Specifications 36.213 "Physical Layer Procedures, Release 8", from 2008, in Section 9.1.1 describes a search space $S_k^{(L)}$ at aggregation level $L\in\{1, 2, 4, 8\}$ which is defined by a contiguous set of CCEs given by the following:

$$(Z_k^{(L)}+i) \bmod N_{CCE,k} \qquad (1)$$

where $N_{CCE,k}$ is the total number of CCEs in the control region of subframe k, $Z_k^{(L)}$ defines the start of the search space, i=0, 1, . . . , $M^{(L)}$. L−1 and $M^{(L)}$ is the number of PDCCHs to monitor in the given search space. Each CCE comprises 36 QPSK modulation symbols. The value of $M^{(L)}$ is specified by Table 9.1.1-1 in 3GPP Technical Specifications 36.213 "Physical Layer Procedures (Release 8)", which is replicated below.

TABLE 1

$M^{(L)}$ vs. Aggregation Level L for PDCCH

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

With this definition, search space for different aggregation levels may overlap with each other regardless of system bandwidth. More specifically, UE-specific search space and common search space may overlap and the search spaces for different aggregation levels may overlap. See one example shown below where there are nine CCEs in total and very frequent overlap between PDCCH candidates:

Example 1

$N_{CCE,k}$=9, $Z_k^{(L)}$={1, 6, 4, 0} for L={1, 2, 4, 8}, respectively.

| Type | Search space $S_k^{(L)}$ Aggregation Level L | PDCCH candidates in terms of CCE index |
|---|---|---|
| UE- | 1 | {1}, {2}, {3}, {4}, {5}, {6} |
| Specific | 2 | {6, 7}, {8, 0}, {1, 2}, {3, 4}, {5,6}, {7,8} |
| | 4 | {4, 5, 6, 7}, {8, 0, 1, 2} |
| | 8 | {0, 1, 2, 3, 4, 5, 6, 7}, {8, 0, 1, 2, 3, 4, 5, 6} |
| Common | 4 | {0, 1, 2, 3}, {4, 5, 6, 7}, {8, 0, 1, 2}, {3, 4, 5, 6} |
| | 8 | {0, 1, 2, 3, 4, 5, 6, 7}, {8, 0, 1, 2, 3, 4, 5, 6} |

Similar as for PDCCH, the EPDCCH is transmitted over radio resources shared by multiple UEs and enhanced CCE (eCCE) is introduced as the equivalent to CCE for PDCCH. An eCCE has also a fixed number of RE but the number of RE available for EPDCCH mapping is generally fewer than this fixed number because many RE are occupied by other signals such as Cell-specific Reference Signals (CRS) and Channel State Information-Reference Signal (CSI-RS). Code chain rate matching is applied whenever an RE belonging to an eCCE contains other colliding signals such as the CRS, CSI-RS, legacy control region or in case of Time Division Duplexing (TDD), the Guard Period (GP) and Uplink Pilot Time Slot (UpPTS). Hence, RE occupied by colliding signals does not belong the available physical channel bits for the EPDCCH.

Consider the example in FIG. 4, where item 14 illustrates the PDCCH mapping, which avoids the CRS so that a CCE always contains $T_{avail}$=36 available REs. In item 16 it is shown how an eCCE contains 36 REs nominally, but the number of available REs is less in case there are colliding signals, hence $T_{avail}$≤36 REs for EPDCCH. Since the colliding signals are subframe dependent, the value of $T_{avail}$ becomes subframe dependent as well and may even be different for different eCCEs if the collisions impact on the eCCEs unevenly. It is noted that when the number of eCCEs per PRB pair is two, see when this occurs in Table 3 below, the nominal number of REs per eCCE is not 36 but instead 72 or 64 for normal and extended cyclic prefix (CP) length, respectively.

In Release 11 of the 3GPP LTE specifications, the EPDCCH supports only the UE specific search space whereas the common search space remains to be monitored in the PDCCH in the same subframe. In future releases, the common search space may be introduced also for EPDCCH transmission. It is specified that the UE monitors eCCE aggregation levels 1, 2, 4, 8, 16 and 32 with restrictions shown in Table 2 below where $n_{EPDCCH}$ is the number of available REs for EPDCCH transmission in a PRB pair. The different aggregation levels are numbered as EPDCCH format 0, 1, 2, 3 and 4. In Table 2, distributed and localized transmission refers to the EPDCCH mapping to resource elements.

TABLE 2

Aggregation levels for EPDCCH

| | Aggregation levels Normal subframes and special subframes, configuration 3, 4, 8, with $n_{EPDCCH}$ <104 and using normal cyclic prefix | | All other cases | |
|---|---|---|---|---|
| EPDCCH format | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

In distributed transmission, an EPDCCH may be mapped to resource elements in up to D PRB pairs, where D=2, 4, or 8, the value of D=16 may also be considered. In this way frequency diversity may be achieved for the EPDCCH message. See FIG. 5 for a schematic example in which a downlink subframe 18 shows four parts belonging to an EPDCCH which is mapped to multiple of the enhanced control regions known as PRB pairs, to achieve distributed transmission and frequency diversity or sub-band precoding.

In localized transmission, an EPDCCH is mapped to one PRB pair only, if the space allows (which is always possible for aggregation level one and two and for normal subframes and normal CP length also for level 4). In case the aggregation level of the EPDCCH is too large, a second PRB pair is used as well, and so on, using more PRB pairs, until all eCCEs belonging to the EPDCCH have been mapped. The number eCCEs that fit into one PRB pair is given by Table 3 below.

TABLE 3

Number of eCCEs per PRB pair in localized transmission

| Normal cyclic prefix | | Extended cyclic prefix | |
|---|---|---|---|
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | | | 2 | |

FIG. 6 shows an illustration of localized transmission. In FIG. 6, downlink subframe 20 shows the four eCCEs belonging to an EPDCCH being mapped to one of the enhanced control regions, to achieve localized transmission.

As an example, in normal subframe and with normal CP length and with $n_{EPDCCH} \geq 104$, localized transmission is using aggregation levels (1, 2, 4, 8) and they are mapped to (1, 1, 1, 2) PRB pairs respectively.

To facilitate the mapping of eCCEs to physical resources each PRB pair is divided into 16 enhanced Resource Element Groups (eREGs) and each eCCE is split into 4 or 8 eREGs for normal and extended cyclic prefix, respectively. An EPDCCH is consequently mapped to a multiple of four or eight eREGs depending on the aggregation level. These eREGs belonging to an ePDCCH resides in either a single PRB pair, as is typical for localized transmission, or a multiple of PRB pairs, as is typical for distributed transmission. The exact division of a PRB pair into eREG may be performed in different ways. One example of the division of a PRB pair into eREGs is illustrated in FIG. 7.

FIG. 7 shows a PRB pair of normal cyclic prefix configuration in a normal subframe. Each tile is a resource element where the number corresponds to the eREG it is grouped within. The right tilted diagonal striped tiles corresponds to the first eREG indexed with 0. The left tilted diagonal striped tiles comprise the demodulation reference signals (DMRS).

Regarding the 3GPP standards, it is not yet agreed in 3GPP how four or eight eREGs respectively are grouped into the eCCEs. It is also an open question as to how the encoded and modulated symbols of an EPDCCH message are mapped to the REs within the resources reserved by its associated eREGs. Additionally, the number of blind decodes per aggregation level for EPDCCH has not yet been decided in the 3GPP standardization work. Likewise, how randomization of the search space for localized and distributed mappings is generated has not yet been decided although overlap between EPDCCH candidates of different aggregation levels will occur also for the EPDCCH as is the case for the PDCCH.

PDCCH and EPDCCH transmission employs circular buffer based rate matching for rate 1/3 Tail-biting Convolutional code. Due to repetition of coded bits and search space overlapping between different aggregation levels, multiple aggregation levels may pass a Cyclic Redundancy Check (CRC) as will be explained here for the PDCCH case where the number of available REs per CCE is always $T_{avail}=36$.

Due to circular-buffer based rate matching, for a given PDCCH aggregation size (2, 4 or 8), coded bits start to repeat themselves after the $1^{st}$ CCE. In FIG. 8, an example for a particular payload size (48 bits) is given. It can be seen, in FIG. 8, that with an aggregation size 8, there are four repetitions and each repetition starts with the same location in the circular buffer.

In general, the necessary condition to have confusing levels may be expressed as shown below in equation (2).

$$3 \times N \times k = 2 \times T_{avail} \times m \quad (2)$$

where N is the ambiguous payload size and m and k are both integers. For PDCCH, the number of modulated symbols per CCE may be, $T_{avail}=36$, as was discussed above. Hence, for PDCCH one may simplify equation (2) as shown below in equation (2').

$$N \times k = 24 \times m \quad (2')$$

Note that, because the UE is not required to decode PDCCH with code rate higher than 0.8, N should be no more than $58 \times (8-m)$. For instance, when N=48, m=2k such that k may take a value of 1, 2, or 4. Any combination of {1, 2, 4, 8} may create confusing, 2 or more, aggregations levels. The LTE PDCCH payload comprises information bits and a corresponding 16-bit Cyclic Redundancy Check (CRC), and the payload size is no less than 12 bits. The CRC bits are a function of the payload bits, and provides the receiver with a possibility to verify with high probability if the detected payload is correct. An exhaustive list of all problematic payload sizes applicable to PDCCH transmission in the LTE system is then shown in set (3) below.

$$\{12, 14, 16, 20, 24, 26, 32, 40, 44, 56\} \quad (3)$$

Due to coded bits repetition and search space overlapping between different aggregation sizes in PDCCH, multiple aggregation sizes may pass the CRC checking. Since the $1^{st}$ CCE of PDCCH is linked to the uplink ACK/NACK resource for dynamic scheduling, a UE may send its ACK/NACK in a different resource which is unknown by the eNB, multiple ACK/NACK resources are possible. As such, there might be confusion in uplink (UL) ACK/NAK resource location mapped from the $1^{st}$ CCE of the corresponding PDCCH grants, when two or more PDCCH decoding candidates from different aggregation levels have different lowest CCE indices. The potentially wrong UL ACK/NAK resource location not only creates unnecessary UL interference, it may also impacts downlink throughput, especially for high geometry UEs. A high geometry UE is a UE with good channel quality such as with a high signal to interference ratio. To avoid this problem for PDCCH, one proposed solution (not relating to embodiments herein) includes one or more zero bits appended to the payload until the DCI format payload does not belong to one of the payloads listed in set (3).

The DCI payload includes a 16 bit CRC, which may then be encoded and rate matched. The block of bits $b^{(i)}(0), \ldots, b^{(i)}(M_{bit}^{(i)}-1)$ on each of the control channels to be transmitted in a subframe, where $M_{bit}^{(i)}$ is the number of bits in one subframe to be transmitted on physical downlink control channel number i, are multiplexed, resulting in a block of bits) $b^{(0)}(0), \ldots, b^{(0)}(M_{bit}^{(0)}-1), b^{(1)}(0), \ldots, b^{(1)}(M_{bit}^{(1)}-1), \ldots, b^{(n_{PDCCH}-1)}(0), \ldots, b^{(n_{PDCCH}-1)}(M_{bit}^{n_{PDCCH}-1}-1)$, where $n_{PDCCH}$ is the number of PDCCHs transmitted in the subframe.

The block of bits $b^{(0)}(0), \ldots, b^{(0)}(M_{bit}^{(0)}-1), b^{(1)}(0), \ldots, b^{(1)}(M_{bit}^{(1)}-1), \ldots, b^{(n_{PDCCH}-1)}(0), \ldots, b^{(n_{PDCCH}-1)}(M_{bit}^{n_{PDCCH}-1}-1)$, are then scrambled with a cell-specific sequence prior to modulation, resulting in a block of scrambled bits $\tilde{b}(0), \ldots, \tilde{b}(M_{tot}-1)$ according to equation (4) below.

$$\tilde{b}(i) = (b(i) + c(i)) \bmod 2 \quad (4)$$

where the scrambling sequence c(i) is described in Section 7.2 of 3GPP Technical Specifications 36.213 "Physical Layer Procedures Release 8". The scrambling sequence generator is initialised with $c_{init} = \lfloor n_s/2 \rfloor 2^9 + N_{ID}^{cell}$ at the start of each subframe where $n_s$ is the slot number. Hence, the initiation of the scrambling sequence depends on the cell-ID, $N_{ID}^{cell}$.

A problem with the problematic payload sizes exists also for EPDCCH transmissions. However, since the number of available REs per eCCE, $T_{avail}$, is neither a fixed number, nor a constant over different subframes, the solution of Table 5.3.3.1.2-1 of 3GPP Technical Specifications 36.212 "Multiplexing and channel coding" of identifying problematic payload sizes becomes intractable, since one set of problematic payload sizes is needed for each possible value of $T_{avail}$. Furthermore, different eCCEs may have a different number of available REs which makes a solution with problematic payload sizes even less attractive.

This leads to the same UL ACK/NACK confusion problem that existed for Release 8 of the 3GPP LTE specifications before a solution was found for PDCCH since also for EPDCCH transmissions, the related UL ACK/NACK resources is a function of the index of the first eCCE of the related DL assignment. In addition, this may lead to a problem of PDSCH resource allocation ambiguity if the aggregation level of the correctly detected EPDCCH is smaller than the aggregation level of the actually transmitted EPDCCH message so that fewer PRB pairs than what was actually used for the DL assignment will be assumed by the UE.

The UE assumes that a scheduled PRB pair that is not used for EPDCCH transmission of the DL assignment will contain the corresponding PDSCH transmission. If the UE detects the EPDCCH with a smaller aggregation level, it may happen in some cases that the UE assumes fewer PRB pairs are used for EPDCCH than what is actually used. In these cases the UE will assume these contain PDSCH transmissions, and the PDSCH reception will fail.

SUMMARY

It is therefore an object of embodiments herein to provide a way of improving communications in LTE systems which minimize and/or avoid the above described issues.

According to a first aspect of embodiments herein, the object is achieved by a method in a communication node for mapping symbols of an Enhanced Physical Downlink Control Channel, EPDCCH, message. The EPDCCH comprises one or more aggregation levels. For each aggregation level, an EPDCCH message is constituted by a set of Control Channel Elements, eCCEs. Each eCCE is mapped to a set of multiple enhanced Resource Element Groups, eREGs, wherein each eREG is a group of Resource Elements, REs, in a Physical Resource Block, PRB, pair. The communication node maps the symbols of the EPDCCH message to the set of REs that constitutes the multiple eREGs that the set of eCCEs correspond to. The order in which the EPDCCH symbols are mapped to the set of REs is dependent on the aggregation level.

According to a second aspect of embodiments herein, the object is achieved by a communication node for mapping symbols of an Enhanced Physical Downlink Control Channel, EPDCCH, message. The EPDCCH comprises one or more aggregation levels. For each aggregation level, an EPDCCH message is constituted by a set of Control Channel Elements, eCCEs. Each eCCE is mapped to a set of multiple enhanced Resource Element Groups, eREGs, wherein each eREG is a group of Resource Elements, REs, in a Physical Resource Block, PRB, pair. The communication node comprises a channel coding circuit configured to map the symbols of the EPDCCH message to the set of REs that constitutes the multiple eREGs that the set of eCCEs correspond to. The order in which the EPDCCH symbols are mapped to the set of REs is dependent on the aggregation level.

Since the aggregation level is indicated in the EPDCCH message, potentially wrong UL ACK/NAK resource location caused by misinterpreted aggregation level by a UE, creating unnecessary UL interference, and impacting downlink throughput negative, can be avoided. This results in improved communications in LTE systems.

An advantage of embodiments herein is that the problem of failure to receive PDSCH when scheduled from EPDCCH with large aggregation levels are removed.

BRIEF DESCRIPTION OF THE DRAWINGS

The accompanying drawings illustrate exemplary embodiments of the present invention, wherein.

DETAILED DESCRIPTION

Figure 1:
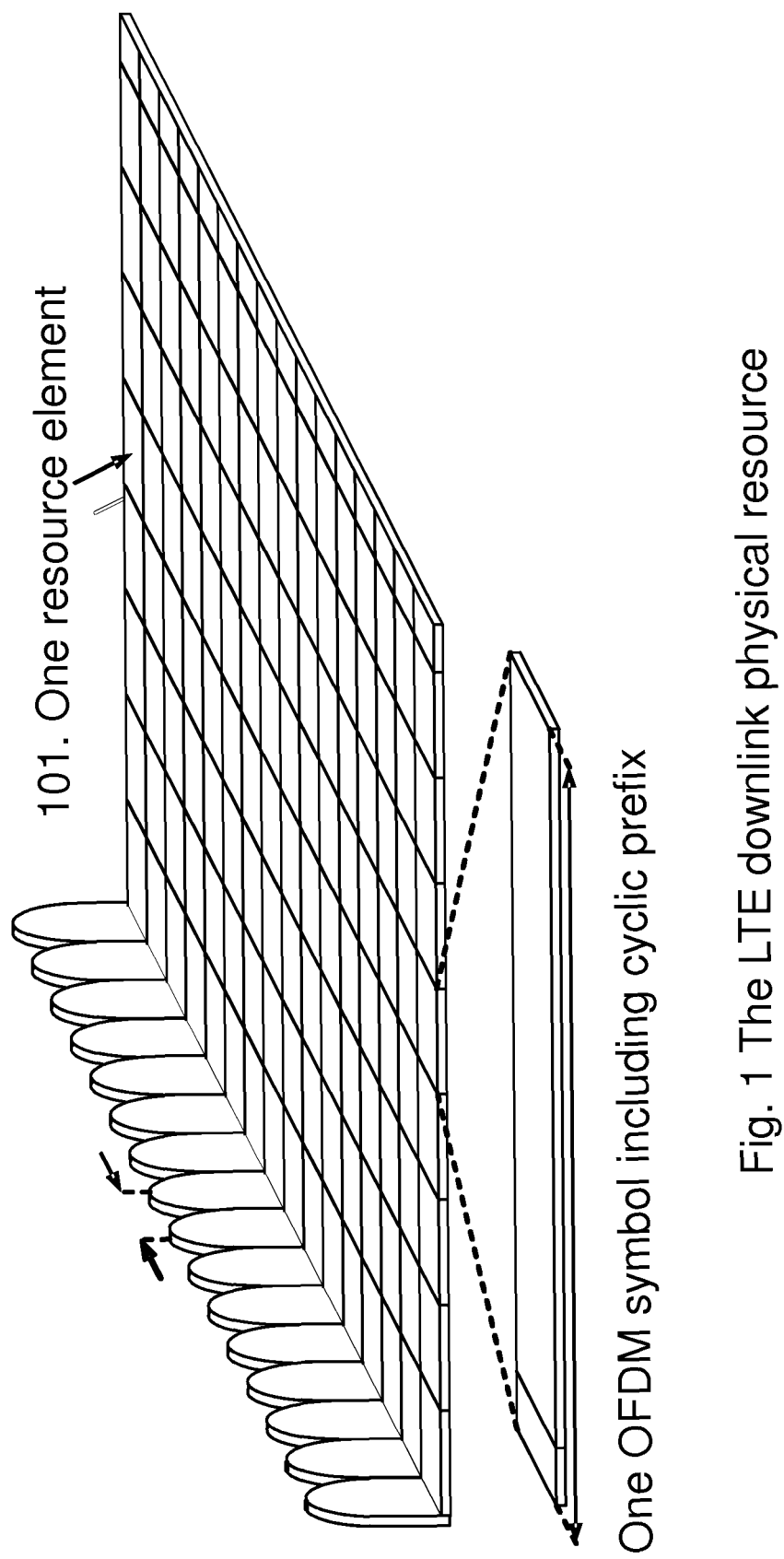
FIG. 1 depicts a Long Term Evolution (LTE) downlink physical resource.
Figure 2:
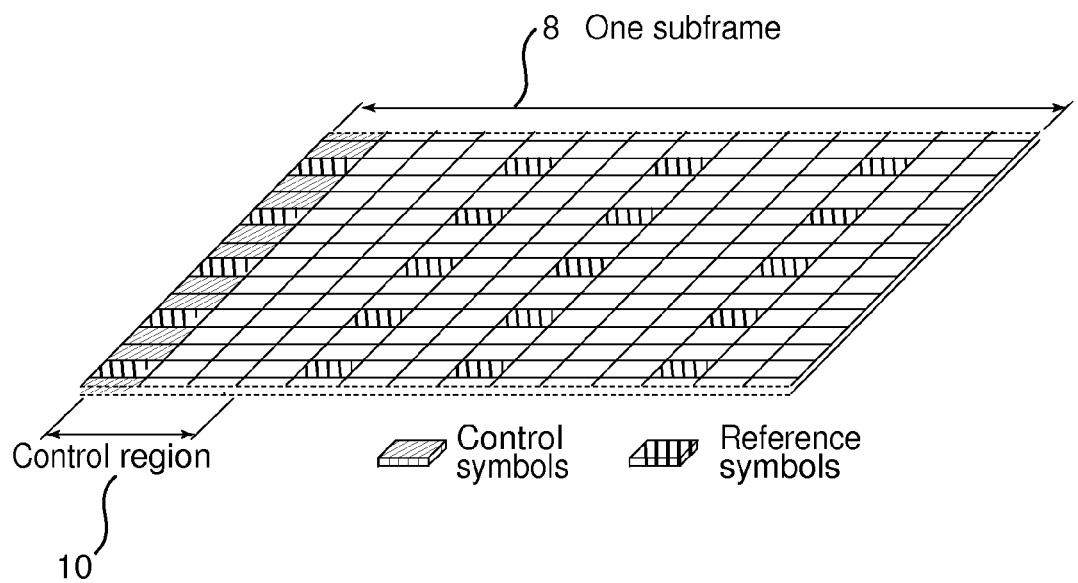
FIG. 2 shows a downlink subframe.
Figure 3:
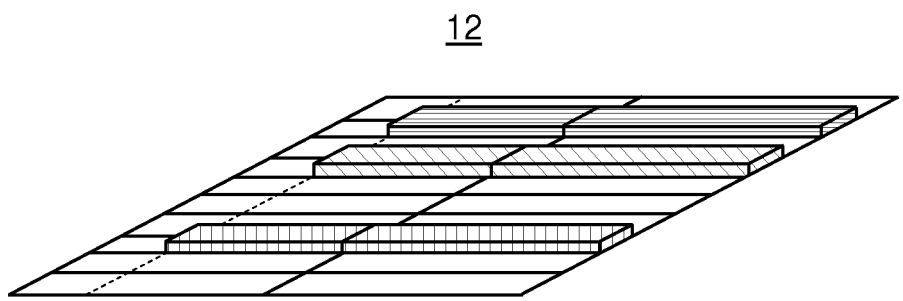
FIG. 3 shows a downlink subframe with ten RB pairs.
Figure 4:
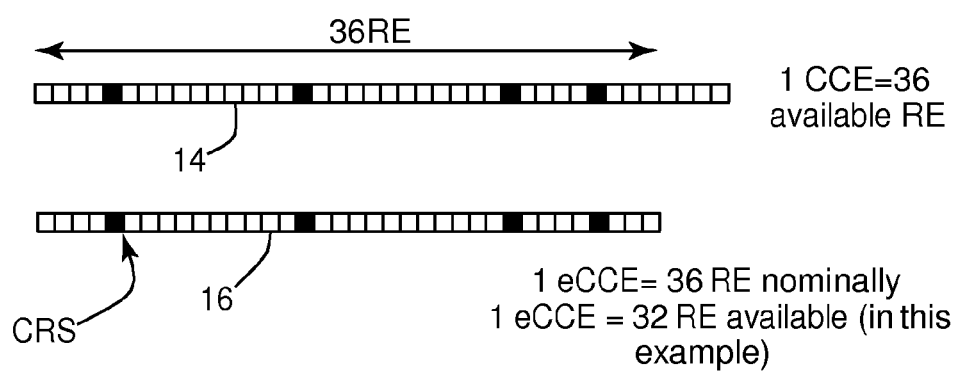
FIG. 4 illustrates a difference between a CCE and an eCCE.
Figure 5:
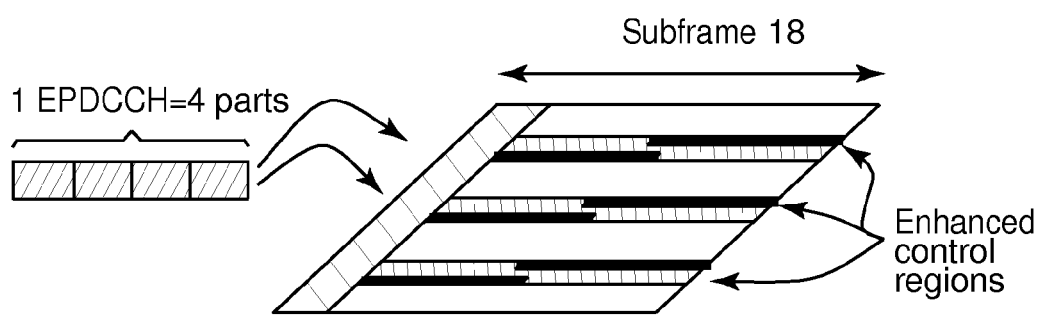
FIG. 5 depicts another downlink subframe.
Figure 6:
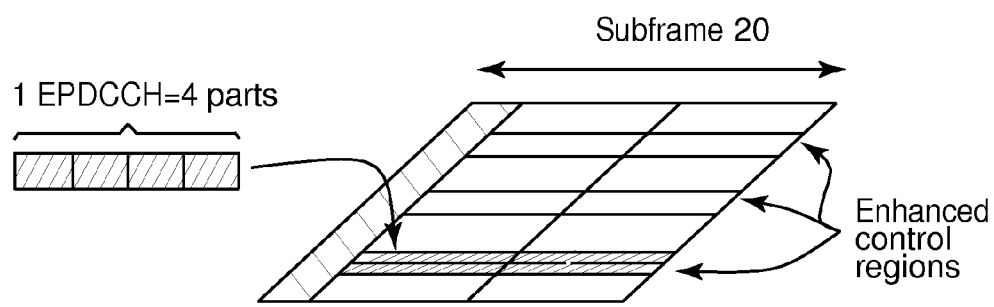
FIG. 6 shows another downlink subframe.
Figure 7:
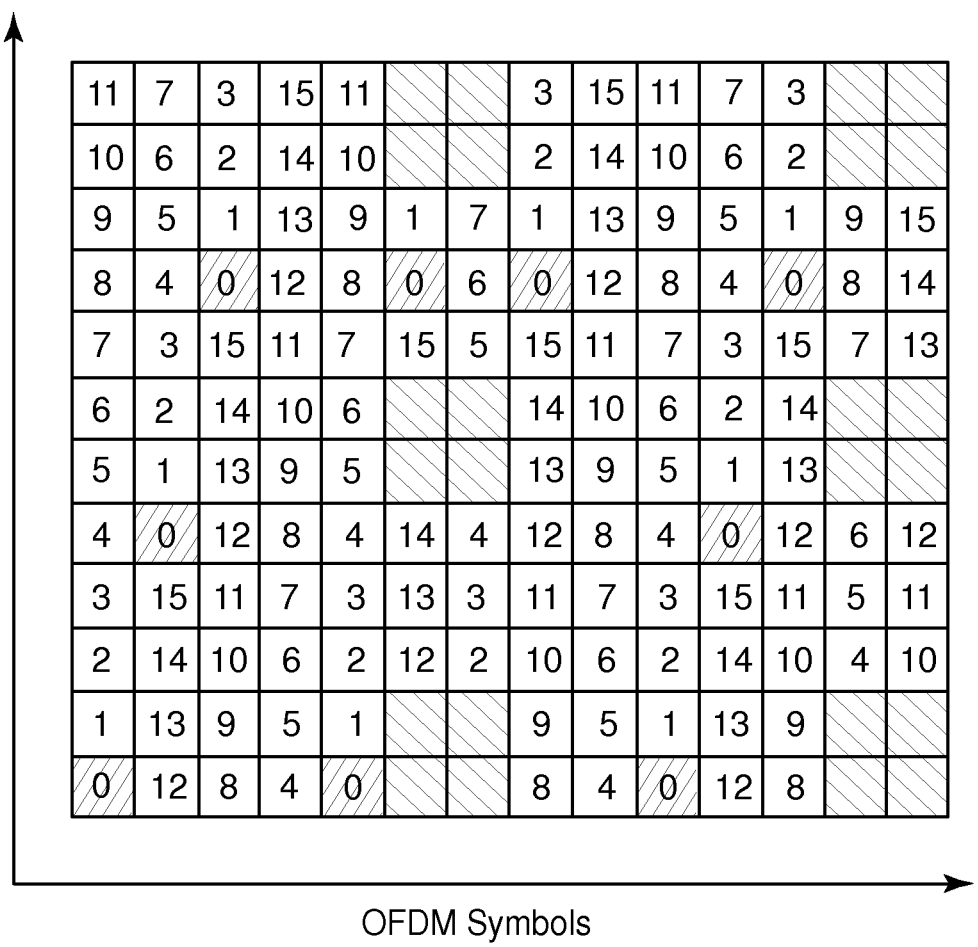
FIG. 7 illustrates a PRB pair of normal cyclic prefix configuration in a normal subframe.
Figure 8:
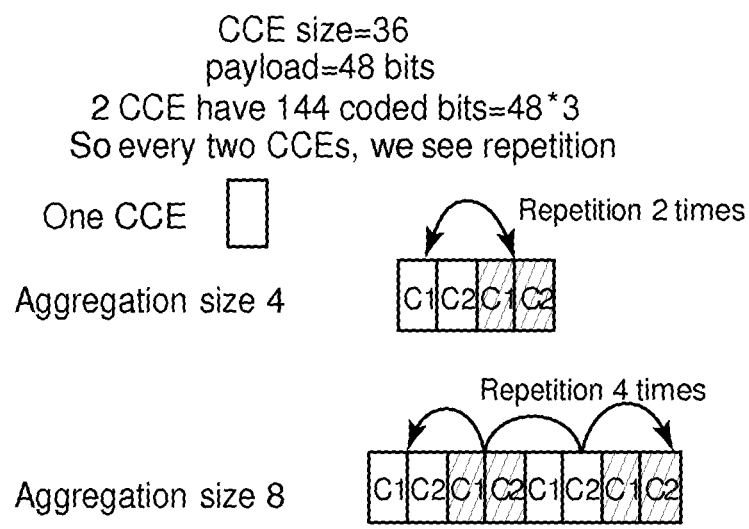
FIG. 8 illustrates a CCE repetition example.

The following detailed description of the invention refers to the accompanying drawings. The same reference numbers in different drawings identify the same or similar elements. Also, the following detailed description does not limit the invention.

In Long Term Evolution (LTE), an enhanced control channel has been introduced in Release 11 known as the enhanced Physical Downlink Control Channel (EPDCCH) which includes an aggregation of N enhanced Control Channel Elements (eCCEs) where N is variable. Due to the structure of the EPDCCH encoder, a UE may under some circumstances detect the EPDCCH correctly by using fewer than the actually used N eCCEs. This may lead to two potential problems: (1) the HARQ-ACK resource will be wrongly selected by the user equipment (UE) and there will be a misunderstanding between eNB and UE which resource is used; and (2) the UE will falsely assume that a PRB pair to be used for EPDCCH transmission is instead used for Physical Downlink Shared Channel (PDSCH) transmission, leading to an error in receiving the PDSCH.

According to an exemplary embodiment herein, these problems may be solved by introducing a means for the UE to detect the used aggregation level of a received EPDCCH transmission. The UE may not deliberately try to detect the aggregation level, but it is a consequence, that when UE has detected the EPDCCH, it also knows the aggregation level without any ambiguity. In this way the UE may detect the EPDCCH without an ambiguity in what aggregation level was used for transmission. This may ensure that the first eCCE index is acquired correctly to get the uplink (UL) ACK/NACK resources correct. Furthermore, exemplary embodiments herein ensure that there is not confusion that a PRB pair containing EPDCCH transmissions is containing PDSCH transmissions.

A way to achieve this is to introduce an EPDCCH specific and aggregation level specific way of mapping symbols of an EPDCCH message to a set of REs that constitutes the multiple eREGs that the set of eCCEs correspond to, wherein the order in which the EPDCCH symbols are mapped to the set of REs is dependent on the aggregation level. An eCCE is defined as a group of 4 or 8 eREG, defined in the OFDM time frequency grid of REs in the physical layer. For instance eCCE#0 may comprise eREG 0, 4, 8 and 12. Each eREG consist in turn of a specified group of REs within a PRB pair. An ePDCCH may comprise one or multiple eCCE(s), hence the set of eCCE(s) that an EPDCCH consists of corresponds in the physical layer to multiple eREGs.

Another way to achieve this is to introduce an EPDCCH specific and aggregation level specific scrambling of the EPDCCH. If the UE does not assume the correct scrambling sequence, i.e. the correct aggregation level, the detection of the EPDCCH will fail.

According to exemplary embodiments, there are systems and methods for removing EPDCCH detection errors in an LTE telecommunications system. The EPDCCH payload, including information bits and appended CRC bits, may be encoded to generate a coded bit sequence for transmission. The coded bits may be input to a circular buffer.

Figure 9:
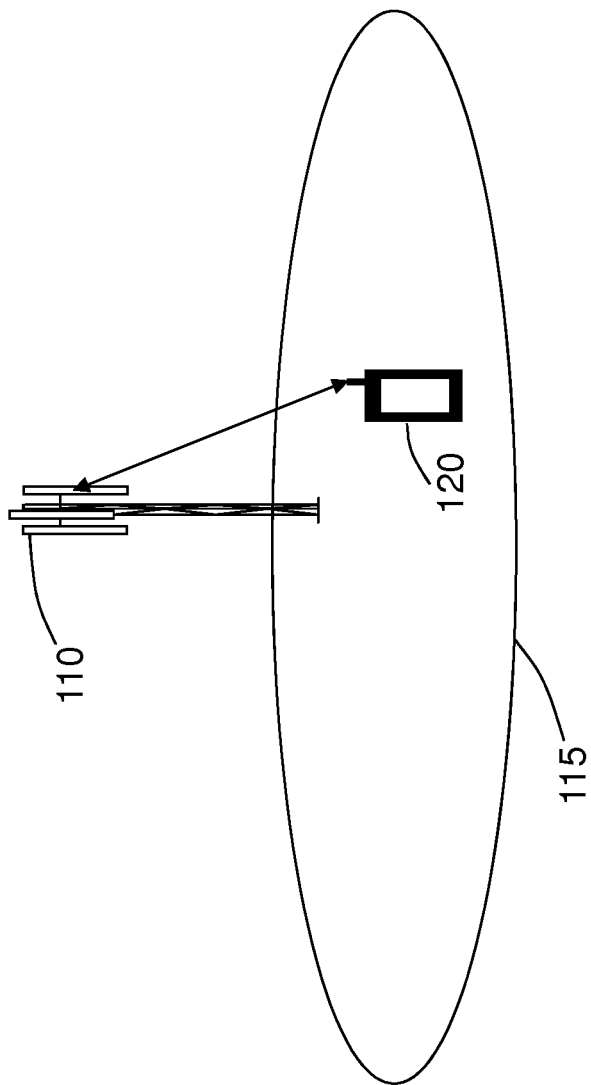
FIG. 9 illustrates embodiments of a radio communications system.

FIG. 9 depicts a radio communications system 100 in which embodiments herein may be implemented. The radio communications system 100 is a wireless communication network such as an LTE system.

The radio communications system 100 comprises one or more cells. In FIG. 9, a communication node 110 is serving a cell 115. The communication node 110 may be an eNodeB, in short eNB, or other transmitting node such as e.g., a relay node, associated with an LTE system.

A user equipment (UE) 120 is located in the cell 115. The UE 120, may e.g. be a mobile phone, a computer such as e.g. a laptop, a Personal Digital Assistant (PDA) or a tablet computer, sometimes referred to as a surf plate, with wireless capability, or any other radio network units capable to communicate over a radio link with the communication node 110 in the radio communications system 100. The UE 120 may also be a relay node.

Figure 10:
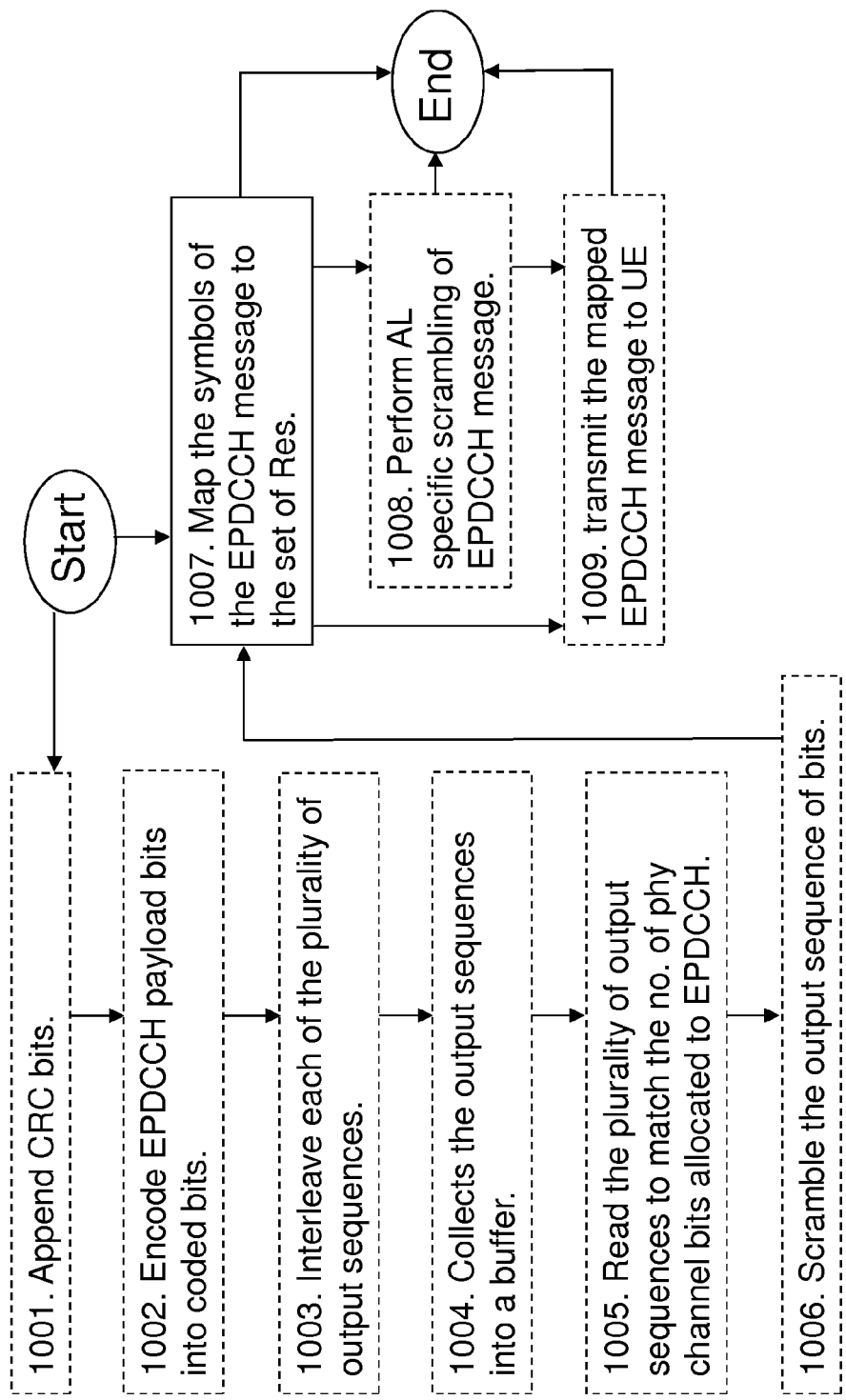
FIG. 10 is a flowchart depicting embodiments of a method in a communication node.

Example embodiments of a method in the communication node 110 for mapping symbols of an Enhanced Physical Downlink Control Channel, EPDCCH, message will now be described with reference to a flowchart depicted in FIG. 10. The communication node 110 may be an eNodeB, in short eNB, or a relay node. The EPDCCH comprises one or more aggregation levels, wherein for each aggregation level, an EPDCCH message is constituted by a set of eCCEs. Each eCCE is mapped to a set of multiple eREGs, wherein each eREG is a group of REs in a PRB pair. The method comprises the following actions, which actions may be taken in any suitable order. The method actions described here are written in a general manner, and will be described more in detail below. The Actions 1001-1006, and 1008-1009 are optional actions according to example embodiments. The optional actions are illustrated in boxes with broken lines in FIG. 10.

Action 1001.

In an example scenario the communication node 110 has received EPDCCH payload bits to be transmitted to the UE 120. The communication node 110 may append CRC bits before the encoding. The CRC bits are a function of the payload bits. According to some embodiments, the entire PDCCH payload is used to calculate the CRC parity bits".

The bits of the PDCCH payload are denoted by $a_0, a_1, a_2, a_3, \ldots, a_{A-1}$, and the parity bits by $p_0, p_1, p_2, p_3, \ldots, p_{L-1}$. A is the PDCCH payload size and L is the number of parity bits.

The parity bits are computed and attached according to section 5.1.1 setting L to 16 bits, resulting in the sequence $b_0, b_1, b_3, \ldots, b_{B-1}$, where B=A+L.

Action 1002.

The communication node 110 encodes the EPDCCH payload bits plus attached CRC bits into three output parity streams of coded bits into coded bits. This is to generate a coded bit sequences.

Action 1003.

In some embodiments the communication node 110 interleaves each of the plurality of output sequences. This is to improve the performance of the channel code.

Action 1004.

In some embodiments the communication node 110 collects the output sequences into a buffer. The buffer may be a circular buffer. This is to provide effective rate matching in the next step, covering the case when the number of physical channel bits is larger, as well as fewer than the number of encoded bits.

Action 1005.

The communication node 110 may read the plurality of output sequences to match the number of physical channel bits allocated to the EPDCCH. This is code chain rate matching, to ensure that there is a one to one mapping between coded bits and physical channel bits.

Action 1006.

The communication node 110 may scramble the output sequence of bits. This is to lower the probability that a UE such as UE 120 detects a PDCCH from an adjacent cell, achieved by assigning different scrambling sequences to different cells, or eNBs such as communication node 110.

Action 1007

According to embodiments herein, the communication node 110 maps the symbols of the EPDCCH message to the set of REs that constitutes the multiple eREGs that the set of eCCEs correspond to. The order in which the EPDCCH symbols are mapped to the set of REs is dependent on the aggregation level. This results in an EPDCCH message that implicitly indicates the aggregation level. When the UE 120 receives the EPDCCH message with the indication, any misinterpreting of the aggregation level is avoided The mapping may be performed by mapping the EPDCCH symbols in a subcarrier-first fashion over the assigned eREGs, e.g. all assigned eREGs, of an EPDCCH set of PRB pairs, and then over time.

In a two-dimensional resource grid, where time (in this context OFDM symbols) is one dimension and frequency (in this context subcarriers) the other, mapping in a subcarrier first fashion means that a message begins to be mapped to the first OFDM symbol in time, over subcarriers in the first OFDM symbol, then continues the mapping in the second OFDM symbol, over the subcarriers in the second symbol, then the third OFDM symbol and so forth.

In some embodiments, the communication node 110 maps the symbols of the EPDCCH message to a set of REs by mapping the EPDCCH symbols in a subcarrier-first fashion over the assigned eREGs within each PRB pair, and then over time, and then over PRB pairs in the EPDCCH set.

In some alternative embodiments, the communication node 110 maps the symbols of the EPDCCH message to a set of REs by mapping the EPDCCH symbols in a subcarrier-first fashion over all PRB pairs belonging to an EPDCCH set, i.e. over the assigned eREGS in all PRB pairs belonging to an EPDCCH set, and then over time.

The different ways of mapping will be described in more detail below.

Action 1008

This is an optional action. The communication node 110 may perform an aggregation level specific scrambling of the EPDCCH message.

In some embodiments, the communication node 110 performs an aggregation level specific scrambling of the EPDCCH message by grouping the encoded bits in chunks of bits of equal or different size comprising one or more bits and reordering the chunks of bits in an order that is dependent on the aggregation level.

In some alternative embodiments, the communication node 110 performs an aggregation level specific scrambling of the EPDCCH message by grouping modulated EPDCCH symbols in chunks of symbols of equal or different size comprising one or more symbols and reordering the chunks in an order that is dependent on the aggregation level.

In some alternative embodiments, the communication node 110 performs the aggregation level specific scrambling of the EPDCCH by scrambling each DCI message of the EPDCCH with its corresponding aggregation level specific scrambling sequence.

In some embodiments, an initialization of a scrambling sequence for performing the aggregation level specific scrambling of the EPDCCH message is dependent on the aggregation level.

In some embodiments, the communication node 110 performs an aggregation level specific scrambling of the EPDCCH message by cyclically shifting the coded bits, wherein cyclically shifting the coded bits is an aggregation level dependent cyclic shift.

The cyclic shift may be performed on modulated symbols or precoded modulated symbols.

The different ways of performing the aggregation level specific scrambling of the EPDCCH message will be described in more detail below.

This action may is performed in combination with the mapping in Action 1007, but may also be performed alone without combining it with the mapping in Action 1007.

Action 1009

This is an optional action. In some embodiments, the communication node 110 transmits the mapped EPDCCH message to the UE 120, wherein the mapping of the EPDCCH message enables the UE 120 to detect the used aggregation level of the EPDCCH payload when received by the UE 120.

Some embodiments relating to the method described above will now be described more in detail.

Figure 11:
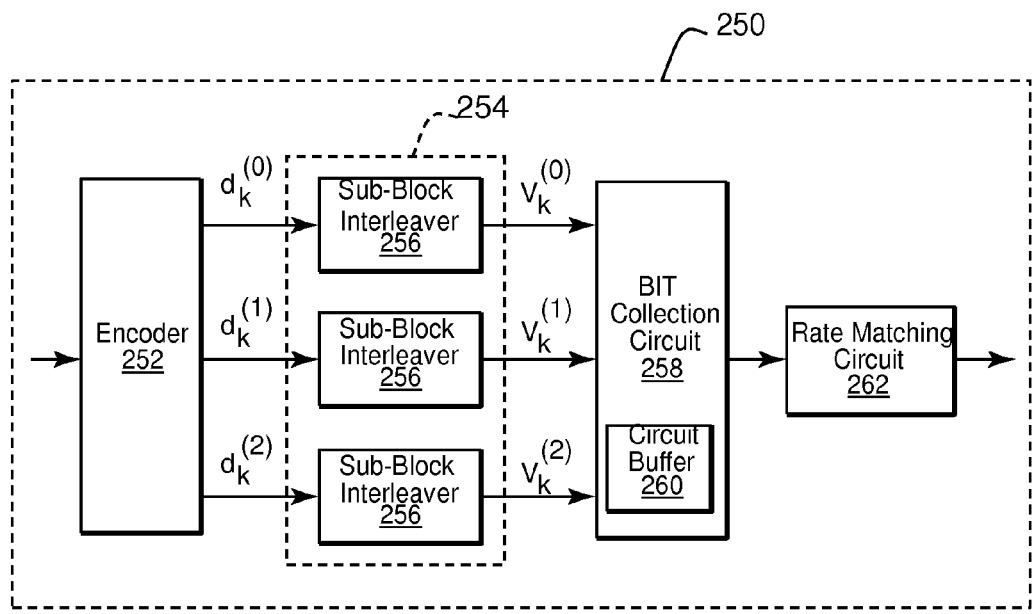
FIG. 11 shows the main functional elements of a channel coding circuit according to an exemplary embodiment.

According to an exemplary embodiment, FIG. 11 shows the main functional elements of a channel coding circuit 250 in an eNB, or other transmitting node such as the communication node 110, for channel coding the EPDCCH. As seen in FIG. 11, the communication node 110 such as an eNB includes an encoder 252, an interleaving circuit 254, a bit collection circuit 258, and a rate matching circuit 260. The components shown in FIG. 11 may be implemented by one or more processors, hardware, firmware, or a combination thereof. The EPDCCH payload including information bits and appended CRC bits may be input to the encoder 252. The encoder 252 encodes the EPDCCH payload plus appended CRC bits to generate a coded bit sequence. This refers to Action 1001 and 1002 above. The encoder 252 may include, for example, a rate 1/3 convolutional encoder. Thus, with a payload size of N bits at the input of the tail-biting convolutional encoder, there are 3×N bits at the output of the encoder 252. Alternatively, other Forward Error Correction (FEC) codes, such as block codes and Turbo codes may also be used.

As illustrated in FIG. 11, the coded bits output from the encoder 252 are input to the interleaving circuit 254. The function of the interleaving circuit 254 is to reorder the coded bits to increase robustness against burst errors. This refers to Action 1003 above. In one exemplary embodiment, the interleaving circuit 254 includes a plurality of sub-block interleavers 256. The coded bit stream output by the encoder 252 is divided into multiple substreams that are input to respective sub-block interleavers 256. The substreams fed to the sub-block interleavers 256 may be denoted $d_k^{(0)}$, $d_k^{(1)}$, and $d_k^{(2)}$ respectively. The sub-block interleavers 256 interleave respective bit streams $d_k^{(0)}$, $d_k^{(1)}$, and $d_k^{(2)}$ to generate the output sequences $v_k^{(0)}$, $v_k^{(1)}$, and $v_k^{(2)}$.

The bit collection circuit 258 collects the output sequences $v_k^{(0)}$, $v_k^{(1)}$, and $v_k^{(2)}$ into a circular buffer 260. This refers to Action 1004 above. The output sequences may be read sequentially into the circular buffer 260. The rate matching circuit 262 reads the coded bits from the circular buffer 260 to fill the control channel elements allocated to the EPDCCH. This refers to Action 1005 above. If the number of transmitted bits exceeds the size of the circular buffer 260, the rate matching circuit 262 wraps to the beginning of the circular buffer 260 and continues reading out bits. This is a feature of the construction of the circular buffer, since an encoded message may be rate matched to any number of physical channel bits by reading out the circular buffer as many wrap around that are necessary, A problem may occur when the number of coded bits in the circular buffer 260 equals the numbers of bits in a subset of the eCCEs allocated to the EPDCCH, that is, fewer than the actual eCCEs used in encoding the EPDCCH message. In such cases, the coded bit sequence may be repeated two or more times with each repetition beginning at the same location in the circular buffer 260. In this case, the CRC may pass for two or more different aggregation levels resulting in ambiguity. For instance, a transmitted message of aggregation level 4 may have it's first half of encoded bits perfectly matching the corresponding encoded message of aggregation level 2. The UE 120 may thus correctly encode the EPDCCH message at an assumed aggregation level 2, and the CRC check will indicate that the message is correct. Hence, the message is correctly received, but the used aggregation level when decoding is not the same as was transmitted.

Figure 12:
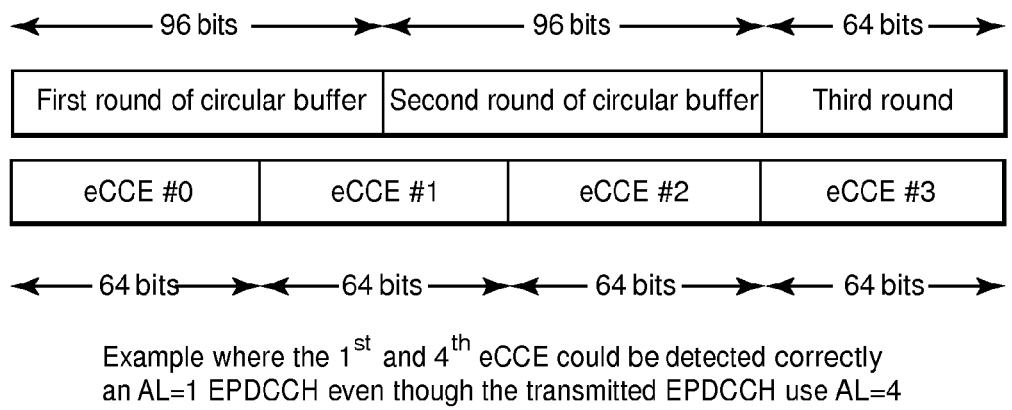
FIG. 12 shows a plurality of eCCEs according to an exemplary embodiment.

In yet another more detailed example, assume an information field of 16 bits, leading to a payload size of 32 bits after 16 bit CRC addition, is to be transmitted with aggregation level 4 where the number of available RE per eCCE is 64 bits. In total there are thus 256 encoded bits and the rate matching buffer holds 96 bits to be circularly read in two and two-thirds revolutions, as seen in FIG. 12. Even if the actually transmitted code words maps to 4 eCCE, it is possible to decode the DCI message using only the first eCCE or the last eCCE. In the example shown in FIG. 12, the $1^{st}$ and $4^{th}$ eCCE could be detected correctly as an Aggregation Level (AL)=1 EPDCCH even though the transmitted EPDCCH uses AL=4.

Accordingly, with 64 available bits per eCCE, a payload of 32 bits creates ambiguity between AL=1 and AL=4 and also ambiguity with respect to the index of the first eCCE. Performing further analysis shows that for this example, the payloads {16, 32, 64, 128} create similar ambiguities. However, if there instead are 62 bits per eCCE, the problematic payloads are instead {31, 62 and 124}. Hence, it is obvious that the set of payloads depends largely on the number of available REs per eCCE, which is variable, and the method of PDCCH to list the set of problematic payloads and append one or more zero bits is not a feasible solution for EPDCCH.

Ambiguity occurs when the eCCEs are mapped to REs in consecutive order within an EPDCCH in the sense that the first part of the encoded bits maps to the first eCCE, the second part to the second eCCE and so forth. To overcome this, in some embodiments herein, the mapping of encoded EPDCCH bits is instead performed such that the mapping is distributed in a structured way over the resources reserved by the eCCEs. According to these embodiments, the EPDCCH is mapped to REs such that it depends on the aggregation level. This refers to Action 1007 above.

An exemplary method for performing the structured way over the resources is now described. For each aggregation level, an EPDCCH message is constituted by a set of eCCEs where each eCCE is mapped to a set of multiple of eREGs. Each eREGs is a unique group of REs in the PRB pair and an EPDCCH message is mapped to a set of REs that constitutes the multiple of eREGs its eCCEs correspond to. Seeing the set of REs reserved by the assigned eREGs belonging to the EPDCCH message, the order which the EPDCCH symbols are mapped to them may be chosen in different ways. The order in these exemplary embodiments is dependent on aggregation level, however other options are also possible.

Figure 13:
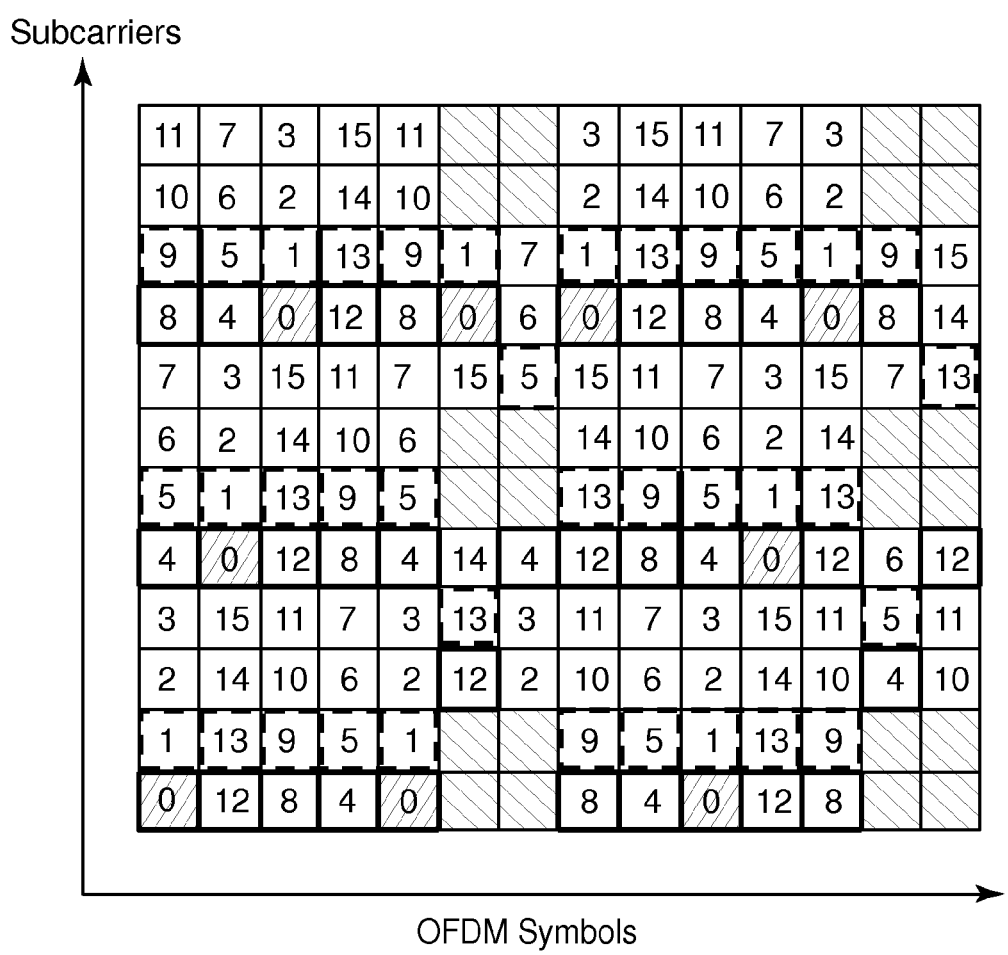
FIG. 13 illustrates how eCCEs may be mapped to eREGs according to an exemplary embodiment.

For example, by mapping the EPDCCH symbols in a sub-carrier first fashion over the assigned eREG, preferably all assigned eREG, belonging to all assigned eCCEs, within each PRB pair, an interleaving of the eREGs and also the eCCEs may be obtained, as indicated in FIG. 13. Since the number of eREGs is aggregation level dependent the mapping order becomes aggregation level dependent as well. If the UE 120 assumes wrong aggregation level, it will fail to decode the EPDCCH message and thereby the ambiguity is resolved. FIG. 13 illustrates how eCCEs may be mapped to eREGs according to an exemplary embodiment.

In the example shown in FIG. 13, one eCCE is mapped to eREG 0, 4, 8 and 12, illustrated by boxes with thick border lines, and another eCCE to eREG 1, 5, 9 and 13, illustrated by boxes with broken border lines. If an EPDCCH is mapped frequency-first within the PRB pair, across all the eREGs, then a message that use only the first eCCE would be mapped to the REs indicated by 0, 4 and 8 in the first OFDM symbol, continuing with REs 12, 0 4 in the $2^{nd}$ OFDM symbol and so forth. For an EPDCCH message using aggregation level two, the EPDCCH would be mapped in a subcarrier-first fashion to the RE marked as 0, 1, 4, 5, 8 and 9 in the first OFDM symbol and so forth in the $2^{nd}$ OFDM symbol. A UE that attempts to decode an EPDCCH under the wrong aggregation level assumption will not successfully be able to decode the EPDCCH message do to this interleaving of RE belonging to different eCCEs.

Hence, for aggregation levels greater than one, this example illustrates that the eCCEs become interleaved which effectively results in an aggregation level dependent RE mapping.

In another example, the mapping of an EPDCCH is done in a subcarrier first fashion, over all eREGs in PRB pairs belonging to the EPDCCH set and then, over time. This also achieves interleaving of the eCCEs due to the mapping and the mapping becomes dependent on the used aggregation level. If the UE 120 assumes the wrong aggregation level, the UE 120 will fail to decode the EPDCCH message and thereby the ambiguity is resolved.

According to some exemplary embodiments, in order to detect whether the correct aggregation level has been used when decoding the EPDCCH, each DCI message may be scrambled with an aggregation level specific scrambling sequence. This refers to Action 1008 above.

Hence, the block of bits $b^{(i)}(0), \ldots, b^{(i)}(M_{bit}^{(i)}-1)$ on each of the control channels to be transmitted in a subframe, where $M_{bit}^{(i)}$ is the number of bits in one subframe to be transmitted on enhanced physical downlink control channel number i, is scrambled, resulting in a block of scrambled bits $\tilde{b}^{(i)}(0), \ldots, \tilde{b}^{(i)}(M_{bit}^{(i)}-1)$ according to equation (5) shown below:

$$\tilde{b}(k)=(b(k)+c_{AL(i)}(k)) \bmod 2, k=0,\ldots,M-1 \quad (5)$$

where $c_{AL(i)}(k)$ is a scrambling sequence that depends on the aggregation level, AL(i) of EPDCCH number i.

According to a further exemplary embodiment, the aggregation level dependent scrambling sequence is obtained by a shift of the same base scrambling sequence c(k) by an aggregation level dependent step according to equation (6) shown below:

$$\tilde{b}(k)=(b(k)+c(k+f(AL(i)))) \bmod 2, k=0,\ldots,M_{bit}-1 \quad (6)$$

where $f(AL(i))$ is a shift function that describes the amount of shift. The purpose of the shift function is that each possible aggregation level should as far as possible have a unique sequence.

In a further example, the shift function is given by Table 4 below. It is further possible to foresee other such examples, that each aggregation level is associated with any arbitrary number as long as none of the aggregation levels share the same number.

TABLE 4

| AL | f (AL (i)) |
|----|------------|
| 1  | 0          |
| 2  | 1          |
| 4  | 2          |
| 8  | 3          |
| 16 | 4          |
| 32 | 5          |

According to another exemplary embodiment, the shift function is $f(x)=x$, leading to equation (7) as shown below:

$$\tilde{b}(k)=(b(k)+c(k+AL(i))) \bmod 2, k=0,\ldots,M_{bit}-1 \quad (7)$$

Where the base scrambling sequence is c(k) and AL(i) is the aggregation level of EPDCCH number i.

In yet another exemplary embodiment, the initialization of the scrambling sequence is dependent on the aggregation level. For this embodiment, the scrambling sequence generator may be initialized as shown in equation (8) below:

$$c_{init}=\lfloor n_s/2 \rfloor 2^9+X+f(AL(i)) \quad (8)$$

at the start of each subframe where $X=N_{ID}^{cell}$ or alternatively, the parameter X may be a UE specific configured parameter, where $n_s$ is the slot number.

In yet another exemplary embodiment the scrambling of the bit sequence $\tilde{b}(k)$, may be performed as shown in equation (9) below:

$$\tilde{b}(k)=(b(k)+c(k)) \bmod 2, k=0,\ldots,M_{bit}-1 \quad (9)$$

Where the initialization to the scrambling sequence c(k) may, for example, be set as shown below in equation (10):

$$c_{init}=Y+X+Z+f(AL(i)) \quad (10)$$

where Y is a time dependent factor that may for example be based on subframe number together with or without a fixed offset, e.g., $Y=\lfloor n_s/2 \rfloor 2^9$, and X is an identity that may depend on the cell identity in some form. X may for example either be equal to the physical cell identifier (PCI), i.e., $X=N_{ID}^{cell}$, or in another example be equal to the EPDCCH id, i.e., $X=n_{ID}^{EPDCCH}$. In a third example X may equal the DM-RS id, i.e., $X=n_{ID}^{DMRS,i}$. Z is a factor that may be dependent on the UE id, for example the UEs cell-radio network temporary identifier (C-RNTI), and $f(AL(i))$ may be a function depending on the aggregation level. An example of a function $f(AL(i))$ that depends on the aggregation level is given in Table 4 (shown above).

According to an exemplary embodiment, one or several of the three variables Y, X and Z may also be omitted from the initialization function or set to zero. In the current embodiment the communication node 110 performs the scrambling of the EPDCCH message before transmitting it to the UE 120. The UE 120 will in the receiver processing perform descrambling as part of its processes to decode the EPDCCH message.

According to other exemplary embodiments the coded bits may be cyclically shifted to ensure that different aggregation levels are as far as possible unique when decoding the EPDCCH messages. This refers to Action 1008 above. The cyclic shift may be implemented at different states as given by the following examples. In some embodiments the cyclic shift may be implemented on the coded bits according to equation (11) shown below.

$$\tilde{b}(k)=b((k+f(AL(i))\bmod M_{bit}) \quad (11)$$

with $k=0, \ldots, M_{bit}-1$ and where the function $f(AL(i))$ is an aggregation level dependent cyclic shift, $b(k)$ is the coded bits for the EPDCCH messages either before or after circular buffer rate matching of the EPDCCH message, $M_{bit}$ is the number of bits associated with one EPDCCH that is being transmitted by the communication node 110 such as an eNB to the UE 120 in one subframe and $\tilde{b}(k)$ is the cyclic shifted bit sequence that after further processing is transmitted from the communication node 110 such as an eNB to the UE 120. The UE 120 would need to perform a reversed operation before attempting to decode the EPDCCH message, i.e., cyclically shift the received bit sequence. An example of a cyclic shift function $f(AL(i))$ based on the aggregation level is given in Table 4 (shown above).

According to another exemplary embodiment the cyclic shift may be implemented on modulated symbols, the modulated symbols may, for example, be quadrature phase shift keying (QPSK) symbols, but embodiments are not limited to this. Below is an example of how a cyclic shift of modulated symbols is performed as shown in equation (12).

$$\tilde{d}(k)=d((k+f(AL(i))\bmod M_{symb}) \quad (12)$$

with $k=0, \ldots, M_{Symb}-1$ and where the function $f(AL(i))$ is an aggregation level dependent cyclic shift for EPDCCH message i, $d(k)$ is the modulated symbols of an EPDCCH message, $M_{symb}$ is the number of modulated symbols associated with one EPDCCH that is being transmitted by the communication node 110 such as an eNB to the UE 120 in one subframe and $\tilde{d}(k)$ is the cyclic shifted modulated sequence that after further processing is transmitted from the communication node 110 such as an eNB to the UE 120. The UE 120 would need to perform a reverse operation before attempting to decode the EPDCCH message, i.e., cyclically shift the received modulated sequence.

An example of a cyclic shift function based on the aggregation level is given in Table 4. In the above example the cyclic shift is performed on modulated symbols, however the cyclic shift may also be performed on precoded modulated symbols.

According to some exemplary embodiments, the encoded bits may be grouped in chunks of equal or different size containing one or more bits and chunks are reordered, either before or after circular buffer rate matching. This refers to Action 1008 above. The order the bits are put in is dependent on the aggregation level which may be expressed as shown in equation (13) below.

$$\tilde{b}(k)=b(\Pi_{AL(i)}(k)) \quad (13)$$

with $k=0, \ldots, M_{bit}-1$ and where $\Pi_{AL(i)}(k)$ is an aggregation level dependent permutation sequence that reorders the chunks of the input sequence.

According to an exemplary embodiment, chunks of modulated symbols may also be defined and in this case the reordering of chunks may also be done on a symbol level after modulation according to equation (14) as shown below.

$$\tilde{d}(k)=d(\Pi_{AL(i)}(k)) \quad (14)$$

with $k=0, \ldots, M_{symb}-1$ for each EPDCCH message i. The permutation sequence $\Pi_{AL(i)}(k)$ may be a cyclically shifted index sequence. The chunks of bits or modulated symbols may, for example, have a size equal to an enhanced resource element group eREG.

Exemplary embodiments allow for the removal of ambiguities due to detection of the wrong aggregation level of an EPDCCH message, leading to removal of the problem of selecting the wrong UL ACK/NACK (A/N) resource since the A/N resource is given by the index of the first eCCE. If the aggregation level, and consequently the eCCE start index is correctly detected, then there is no problem of A/N resource selection anymore.

Figure 14:
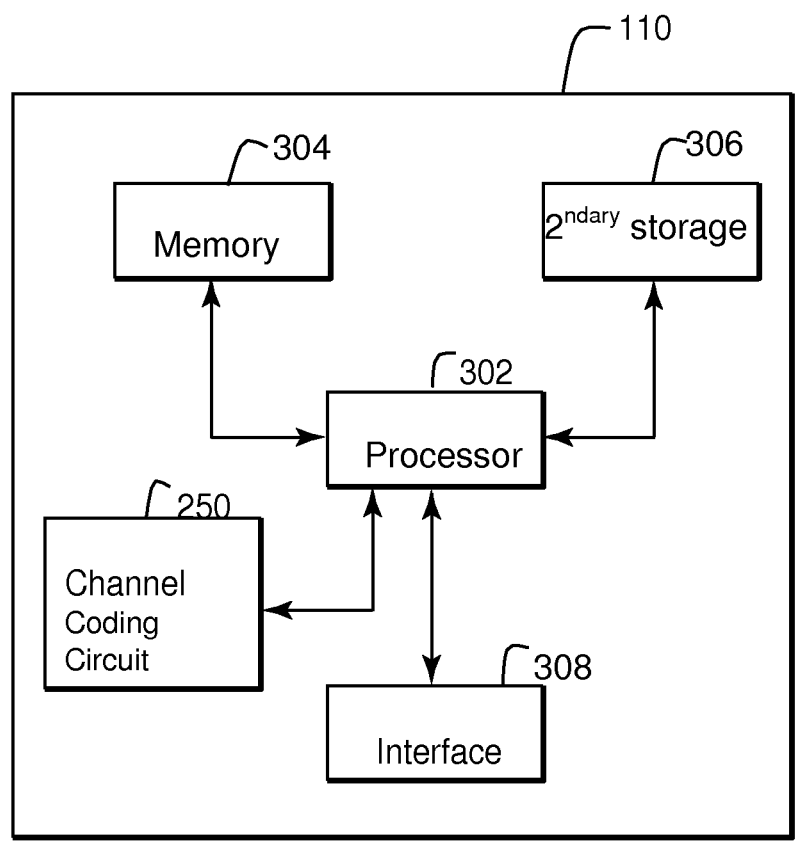
FIG. 14 shows a communication node according to an exemplary embodiment.

To perform the method actions for mapping symbols of an EPDCCH message described above in relation to FIG. 10, the communication node 110 comprises the following arrangement depicted in FIG. 11 and FIG. 14. As mentioned above The communication node 110 may comprise a processor 302, or multiple processor cores, a memory 304, one or more secondary storage devices 306, an interface unit such as an interface 308 for communications, to facilitate communications between the communication node 110 and other nodes/devices, e.g., UE 120 or other UEs, and a channel coding circuit 250. The channel coding circuit 250 is depicted in FIG. 11 and has been described above. It is comprised in the communication node 110 as depicted in FIG. 14. Alternatively, the communication node 110 may be configured to be a UE which is capable of receiving and decoding the messages described in the above described exemplary embodiments. The interface unit 308 may, for example, include a transceiver configured to transmit and receive radio signals over an air interface in accordance with a suitable standard. As mentioned above, the EPDCCH comprises one or more aggregation levels. For each aggregation level, an EPDCCH message is constituted by a set of eCCEs. Each eCCE is mapped to a set of multiple eREGs, wherein each eREG is a group of REs in a PRB, pair. The communication node 110 may e.g. be an eNodeB or a relay node.

The communication node 110 comprises the channel coding circuit 250 configured to map the symbols of the EPDCCH message to the set of REs that constitutes the multiple eREGs that the set of eCCEs correspond to. The order in which the EPDCCH symbols are mapped to the set of REs is dependent on the aggregation level.

The channel coding circuit 250 may further be configured to map the EPDCCH symbols in a subcarrier-first fashion over the assigned eREGs of an EPDCCH set of PRB pairs, and then over time.

In some embodiments, the channel coding circuit 250 further is configured to map the symbols of the EPDCCH message to a set of REs by mapping the EPDCCH symbols in a subcarrier-first fashion over the assigned eREGs, within each PRB pair, and then over time, and then over PRB pairs in the EPDCCH set.

In some alternative embodiments, the channel coding circuit 250 further is configured to map the symbols of the EPDCCH message to a set of REs by mapping the EPDCCH symbols in a subcarrier-first fashion over the assigned eREGS in all PRB pairs belonging to an EPDCCH set, and then over time.

The channel coding circuit 250 may further be configured to perform an aggregation level specific scrambling of the EPDCCH message.

In some embodiments, the channel coding circuit 250 further is configured to perform the aggregation level specific scrambling of the EPDCCH message by grouping the encoded bits in chunks of bits of equal or different size comprising one or more bits and reordering the chunks of bits in an order that is dependent on the aggregation level.

In some embodiments, the channel coding circuit 250 further is configured to perform the aggregation level specific scrambling of the EPDCCH message by grouping modulated EPDCCH symbols in chunks of symbols of equal or different size comprising one or more symbols and reordering the chunks in an order that is dependent on the aggregation level.

The channel coding circuit 250 may further be configured to perform the aggregation level specific scrambling of the EPDCCH message by scrambling each DCI message of the EPDCCH with its corresponding aggregation level specific scrambling sequence.

An initialization of a scrambling sequence for performing the aggregation level specific scrambling of the EPDCCH message may be dependent on the aggregation level.

The channel coding circuit 250 may further be configured to perform the aggregation level specific scrambling of the EPDCCH message by cyclically shifting the coded bits, wherein the cyclically shifting the coded bits is an aggregation level dependent cyclic shift.

The cyclic shift may be performed on modulated symbols or precoded modulated symbols.

The communication node 110 may further comprise the encoder 252 configured to encode EPDCCH payload bits into coded bits, and append CRC bits. The encoder 252 is shown in FIG. 11.

The communication node 110 may further comprise the interleaving circuit 254 configured to interleave each of the plurality of output sequences, The interleaving circuit 254 is shown in FIG. 11.

The communication node 110 may further comprise the rate matching circuit 262 configured to read the plurality of output sequences to match the number of physical channel bits allocated to the EPDCCH, and to scramble the output sequence of bits of the rate matching circuit. The rate matching circuit 262 is also shown in FIG. 11.

The interface 308 may be configured to transmit the mapped EPDCCH message to the UE 120, which mapping of the EPDCCH message enables the UE 120 to detect the used aggregation level of the EPDCCH payload when received by the UE 120.

The communication node 110 may further comprise the bit collection circuit 258 configured to collect the output sequences into a buffer; wherein the buffer may be a circular buffer of the communication node 110. The bit collection circuit 258 is shown in FIG. 11.

The disclosed exemplary embodiments provide for the removal of ambiguities due to detection of the wrong aggregation level of an EPDCCH message. It should be understood that this description is not intended to limit the invention. On the contrary, the exemplary embodiments are intended to cover alternatives, modifications and equivalents, which are included in the scope of the claims. Further, in the detailed description of the exemplary embodiments, numerous specific details are set forth in order to provide a comprehensive understanding of the embodiments herein. However, one skilled in the art would understand that various embodiments may be practiced without such specific details.

Although the features and elements of the present exemplary embodiments are described in the embodiments in particular combinations, each feature or element may be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

According to an exemplary embodiment, there is a method for removing enhanced Physical Downlink Control Channel (EPDCCH) detection errors in a Long Term Evolution (LTE) system, the method comprising: encoding an EPDCCH payload including information bits and appended cyclic redundancy check (CRC) bits into coded bits; reordering the coded bits into a plurality of output sequences; collecting the output sequences into a buffer; reading the output sequences by a rate matching circuit to fill control channel elements allocated by the EPDCCH; and performing an aggregation level specific scrambling of the EPDCCH.

According to an exemplary embodiment, the step of performing an aggregation level specific scrambling of the EPDCCH further comprises: scrambling each DCI message with an aggregation level specific scrambling sequence. According to an exemplary embodiment, initialization of the scrambling sequence is dependent on the aggregation level. According to another exemplary embodiment, the buffer may be a circular buffer.

According to an exemplary embodiment, the step of performing an aggregation level specific scrambling of the EPDCCH further comprises: cyclically shifting the coded bits. According to an exemplary embodiment, the cyclically shifting the coded bits may be an aggregation level dependent cyclic shift.

According to an exemplary embodiment, the step of performing an aggregation level specific scrambling of the EPDCCH further comprises: having an EPDCCH to resource element (RE) mapping that depends on the aggregation level.

According to an exemplary embodiment, any, all or some subset of the methods described above may be implemented by an eNodeB or other transmitting node, e.g., a relay node, associated with the LTE system. The eNodeB may include a processor, a memory, an interface for communications and a channel coding circuit one or more of which are configured to perform the steps described in the foregoing paragraphs. According to an exemplary embodiment the channel coding circuit may include an encoder, an interleaver circuit, a bit collection circuit and a rate matching circuit.

According to an exemplary embodiment, a method in the communication node 110 for handling an EPDCCH message is provided. The method comprising:

encoding an EPDCCH payload including information bits and appended Cyclic Redundancy Check, CRC bits into coded bits;

reordering the coded bits into a plurality of output sequences;

collecting the output sequences into a buffer;

reading the output sequences by a rate matching circuit to fill control channel elements allocated by the EPDCCH; and performing an aggregation level specific scrambling of the EPDCCH.

The aggregation level specific scrambled EPDCCH message may then be transmitted to the UE 120.

The aggregation level specific scrambling of the EPDCCH enables the UE 120 to detect the used aggregation level of the EPDCCH message when received by the UE 120.

The invention claimed is:

1. A method in a communication node for mapping symbols of an Enhanced Physical Downlink Control Channel (EPDCCH) message, which EPDCCH comprises one or more of at least two predefined aggregation levels, wherein for each predefined aggregation level an EPDCCH message is constituted by a set of Control Channel Elements (eCCEs), where each eCCE is mapped to a set of multiple enhanced Resource Element Groups (eREGs), wherein each eREG is a group of Resource Elements (REs) in a Physical Resource Block (PRB) pair, the method comprising:

mapping the symbols of the EPDCCH message to the set of REs that constitutes the multiple eREGs that the set of eCCEs correspond to, wherein the order in which the EPDCCH symbols are mapped to the set of REs is dependent on the aggregation level for the EPDCCH message, so that the mapping of the EPDCCH message enables the UE to detect the used aggregation level of the EPDCCH payload when received by the UE, wherein the mapping is performed by mapping the EPDCCH symbols in a subcarrier-first fashion over the eREGs of an EPDCCH set of PRB pairs, and then over time; and transmitting the mapped EPDCCH message to a user Equipment (UE).

2. The method of claim 1, further comprising:

appending Cyclic Redundancy Check (CRC) bits, and encoding EPDCCH payload bits and CRC bits into three output parity streams of coded bits;

interleaving each of the plurality of output sequences;

reading the plurality of output sequences to match the number of physical channel bits allocated to the EPDCCH; and scrambling the output sequence of bits.

3. The method of claim 1, further comprising performing an aggregation-level-specific scrambling of the EPDCCH message.

4. The method of claim 3, wherein performing an aggregation-level-specific scrambling of the EPDCCH message further comprises grouping the encoded bits in chunks of bits of equal or different size comprising one or more bits and reordering the chunks of bits in an order that is dependent on the aggregation level.

5. The method of claim 3, wherein performing an aggregation-level-specific scrambling of the EPDCCH message further comprises grouping modulated EPDCCH symbols in chunks of symbols of equal or different size comprising one or more symbols and reordering the chunks in an order that is dependent on the aggregation level.

6. The method of claim 3, wherein performing the aggregation-level-specific scrambling of the EPDCCH further comprises scrambling each Downlink Control Information (DCI) message of the EPDCCH with its corresponding aggregation-level-specific scrambling sequence.

7. The method of claim 3, wherein an initialization of a scrambling sequence for performing the aggregation-level-specific scrambling of the EPDCCH message is dependent on the aggregation level.

8. The method of claim 3, wherein performing an aggregation-level-specific scrambling of the EPDCCH message further comprises cyclically shifting the coded bits, wherein the cyclically shifting the coded bits is an aggregation-level-dependent cyclic shift.

9. The method of claim 8, wherein the cyclic shift is performed on modulated symbols or precoded modulated symbols.

10. The method of claim 1, further comprising collecting the output sequences into a buffer, wherein the buffer is a circular buffer.

11. The method of claim 1, wherein the communication node is an eNodeB or a relay node.

12. A communication node for mapping symbols of an Enhanced Physical Downlink Control Channel (EPDCCH) message, which EPDCCH comprises one or more of at least two predefined aggregation levels, wherein for each predefined aggregation level an EPDCCH message is constituted by a set of Control Channel Elements (eCCEs), where each eCCE is mapped to a set of multiple enhanced Resource Element Groups (eREGs), wherein each eREG is a group of Resource Elements (REs) in a Physical Resource Block (PRB) pair, the communication node comprising:

a channel coding circuit configured to map the symbols of the EPDCCH message to the set of REs that constitutes the multiple eREGs that the set of eCCEs correspond to, such that the order in which the EPDCCH symbols are mapped to the set of REs is dependent on the aggregation level, so that the mapping of the EPDCCH message enables the UE to detect the used aggregation level of the EPDCCH payload when received by the UE, wherein the channel coding circuit further is configured to map the EPDCCH symbols a subcarrier-first fashion over the eREGs of an EPDCCH set of PRB pairs, and then over time; and a transceiver configured to transmit the mapped EPDCCH message to a user Equipment (UE).

13. The communication node of claim 12, further comprising:

an encoder configured to append Cyclic Redundancy Check, CRC bits, and encode EPDCCH payload bits and CRC bits into three output parity streams of coded bits;

an interleaving circuit configured to interleave each of the plurality of output sequences; and a rate matching circuit configured to read the plurality of output sequences to match the number of physical channel bits allocated to the EPDCCH and to scramble the output sequence of bits of the rate matching circuit.

14. The communication node of claim 12, wherein the channel coding circuit is further configured to perform an aggregation-level-specific scrambling of the EPDCCH message.

15. The communication node of claim 14, wherein the channel coding circuit further is configured to perform the aggregation-level-specific scrambling of the EPDCCH message by grouping the encoded bits in chunks of bits of equal or different size comprising one or more bits and reordering the chunks of bits in an order that is dependent on the aggregation level.

16. The communication node of claim 14, wherein the channel coding circuit further is configured to perform the aggregation-level-specific scrambling of the EPDCCH message by grouping modulated EPDCCH symbols in chunks of symbols of equal or different size comprising one or more symbols and reordering the chunks in an order that is dependent on the aggregation level.

17. The communication node of claim 14, wherein the channel coding circuit further is configured to perform the aggregation-level-specific scrambling of the EPDCCH message by scrambling each Downlink Control Information (DCI) message of the EPDCCH with its corresponding aggregation-level-specific scrambling sequence.

18. The communication node of claim 14, wherein an initialization of a scrambling sequence for performing the aggregation-level-specific scrambling of the EPDCCH message is dependent on the aggregation level.

19. The communication node of claim 14, wherein the channel coding circuit further is configured to perform the aggregation-level-specific scrambling of the EPDCCH message by cyclically shifting the coded bits, wherein the cyclically shifting the coded bits is an aggregation-level-dependent cyclic shift.

20. The communication node of claim 19, wherein the cyclic shift is performed on modulated symbols or precoded modulated symbols.

21. The communication node of claim 12, further comprising a bit collection circuit configured to collect the output sequences into a buffer; wherein the buffer is a circular buffer of the communication node.

22. The communication node of claim 12, wherein the communication node is an eNodeB or a relay node.

* * * * *